US012602306B2

(12) United States Patent
Madala et al.

(10) Patent No.:     US 12,602,306 B2
(45) Date of Patent:     Apr. 14, 2026

(54) RESTORATION OF SYSTEM STATES IN DATA PROCESSING SYSTEMS

(71) Applicant: Dell Products L.P., Round Rock, TX (US)

(72) Inventors: Raveendra Babu Madala, Agiripalli (IN); Santosh Gore, Bangalore (IN); Sakshi Garg, Faridabad (IN)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 18/417,388

(22) Filed: Jan. 19, 2024

(65) Prior Publication Data

US 2025/0238341 A1     Jul. 24, 2025

(51) Int. Cl.
*G06F 11/34*     (2006.01)
*G06F 11/1492*     (2026.01)

(52) U.S. Cl.
CPC ...... *G06F 11/3438* (2013.01); *G06F 11/1492* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 8,621,439 B2 | 12/2013 | Krause et al. | |
| 9,665,474 B2 | 5/2017 | Li et al. | |
| 9,891,971 B1 | 2/2018 | Kuhhirte | |
| 10,353,808 B2 | 7/2019 | Kumar et al. | |
| 10,666,279 B1 | 5/2020 | Schurmann | |
| 10,701,130 B2 | 6/2020 | Movsisyan et al. | |
| 11,080,121 B2 | 8/2021 | Thornhill et al. | |
| 11,113,180 B2 | 9/2021 | Gurajada | |
| 11,240,126 B2 | 2/2022 | Makwarth et al. | |
| 11,696,712 B2 | 7/2023 | Dyell et al. | |
| 11,734,102 B1 * | 8/2023 | Wang | G06F 11/0793 714/26 |
| 11,770,456 B1 * | 9/2023 | Patel | H04L 67/51 709/223 |
| 11,809,271 B1 * | 11/2023 | Wang | G06F 11/008 |
| 11,831,706 B1 * | 11/2023 | Patel | H04L 67/10 |
| 2015/0312086 A1 | 10/2015 | Terwilliger | |

(Continued)

OTHER PUBLICATIONS

ServiceNow. (Mar. 26, 2018). "Incident Management." ServiceNow Documentation. <https://www.servicenow.com/community/s/cgfwn76974/attachments/cgfwn76974/it-service-management-forum/254880/1/Incident%20Management.pdf> (81 pages).

*Primary Examiner* — June Sison
(74) *Attorney, Agent, or Firm* — WOMBLE BOND DICKINSON (US) LLP

(57)     ABSTRACT

Methods and systems for managing data processing systems are disclosed. The data processing systems may be managed by restoring the system states in the data processing systems. The system states may be restored in the data processing systems by remediating configurations and/or processes after incidents are resolved. The configurations and/or processes may be changed by remediation of incidents in data processing systems. Restoration of a system state to a goal state may require implementation of action items in the data processing system. The action items that yield restoration of the system state may be stored in a repository for future use.

20 Claims, 6 Drawing Sheets

(56)  References Cited

U.S. PATENT DOCUMENTS

| | | |
|---|---|---|
| 2018/0329768 A1 | 11/2018 | Bikumala |
| 2020/0004618 A1 | 1/2020 | Thornhill et al. |
| 2023/0061007 A1 | 3/2023 | Patti et al. |
| 2023/0068096 A1 | 3/2023 | Patti et al. |
| 2024/0362097 A1* | 10/2024 | Paulraj ..................... G06N 5/04 |

* cited by examiner

RESTORATION OF SYSTEM STATES IN DATA PROCESSING SYSTEMS

FIELD

Embodiments disclosed herein relate generally to managing data processing systems. More particularly, embodiments disclosed herein relate to restoring system states in data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
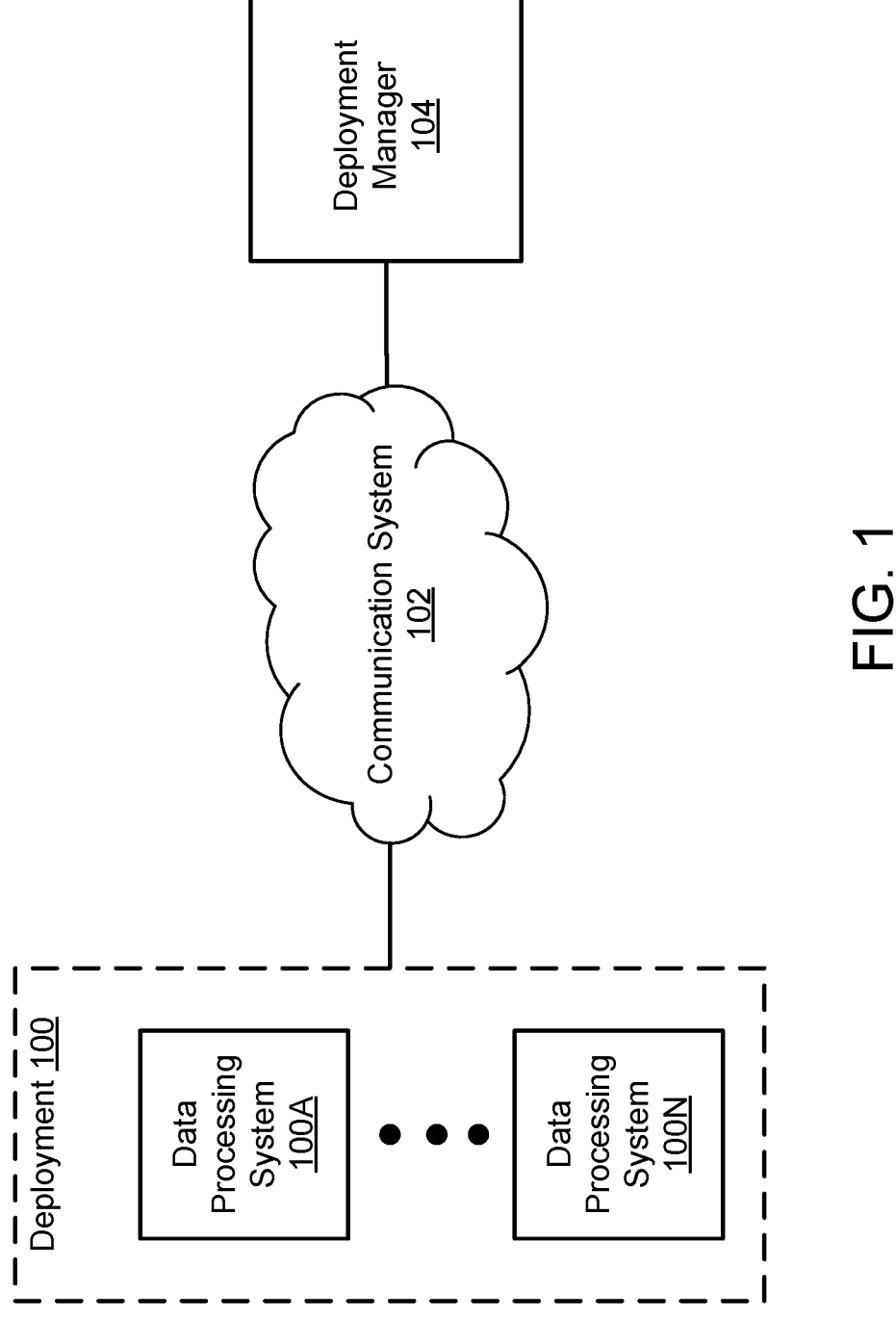
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may be managed by restoring the system states in the data processing systems. The system states may be restored in the data processing systems by remediating configurations and/or processes after incidents are resolved.

An incident may occur in a data processing system that may affect one or more configurations and/or processes. After reporting the incident to a technician, the data processing system may be remediated by implementing a method to address the incident. Although the method remediates the data processing system, the method may have produced a change in a configuration and/or process that causes the system state of the data processing system to deviate from a goal state.

To remediate the deviation in the system state of the data processing system, the goal state may first be identified. After identification of the goal state, a comparison between the goal and the system state of the data processing system may be done. The comparison may yield one or more differences between the goal state and the system state of the data processing system. Action items may be implemented to restore the system state of the data processing system to the goal state. Once the standardized state on the data processing system has been restored, the action items may be stored in a repository for future use.

In an embodiment, a method for managing data processing systems is disclosed. The method may include: (i) identifying that an impact of an issue with respect to a data processing system of the data processing systems has been resolved; (ii) identifying a state of the data processing system after the impact has been resolved; (iii) identifying a goal state for the data processing system; (iv) making a determination regarding whether the state of the data processing system matches the goal state for the data processing system; (v) in a first instance of the determination where the state of the data processing system does not match the goal state for the data processing system: (a) identifying at least one difference between the state of the data processing system and the goal state for the data processing system; (b) performing at least one action to resolve the at least one difference to conform the state of the data processing system to the goal state for the data processing system; (c) documenting the at least one action to address future instances of the issue; and (d) providing, using the data processing system in the conformed state, computer implemented services.

Performance of a resolution action to cause the impact to have been resolved causes the at least one difference between the state of the data processing system and the goal state of the data processing system.

Identifying the state of the data processing system may include (i) obtaining telemetry data from the data processing system after the impact has been resolved; (ii) enumerating processes hosted by the data processing system using the telemetry data; and (iii) enumerating configurations for at least the processes and/or hardware components of the data processing system.

The goal state may include (i) first information regarding a set of processes for the data processing system for the data processing system to operate in a desired manner; and (ii) second information regarding a set of configurations for the processes and/or the hardware components of the data processing system to operate in the desired manner.

Identifying at least one difference may include (i) making a first comparison between the enumerated processes and the set of processes to identify a process difference; (ii) making a second comparison between the enumerated configuration at the set of configurations to identify a configuration difference; and (iii) obtaining the at least one difference using the process difference and/or the configuration difference.

In a second instance of the determination where the state of the data processing system matches the goal state for the data processing system: providing, using the data processing system in a first state entered into due to the performance of the resolution action to cause the impact to have been resolved, computer implemented services.

The at least one action comprises an action from a list of actions may consist of (i) installing a first software package; (ii) removing a second software package; and (iii) updating a configuration of the data processing system.

The method may further include performing a runbook automation to attempt to resolve the issue.

Documenting the at least one action to address future instances of the issue may include adding a new entry to a runbook automation database, the new entry being based at least in part on the at least one action.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system may include data processing systems. The data processing systems may be responsible for conforming to a goal state. The goal state may be a system state of the data processing systems in which the data processing systems are able to be used to provide the computer implemented services.

However, overtime the data processing systems may leave the goal state and enter into another state which may impact the ability of the data processing systems to provide the computer implemented services. For example, an incident (e.g., change in operation of a hardware component/software component, change in configuration, etc.) may occur that alters and/or interferes with the configurations and/or the processes that causes a data processing system to leave the goal state.

To reduce the impact of being out of the goal states, such incidents and/or changes in states of the data processing systems may be tracked. When such incidents/state changes are identified, remedial activity may be performed to attempt to return the state of the data processing system to the goal state. For example, the incident may be reported to and/or assigned to technicians for management. The assigned technicians may be responsible for remediation of the configurations and/or the processes to return the data processing system to the goal state. Once remediation of the configurations and/or the processes within a system state, the configurations and/or the processes in the data processing system may be presumed to operate in a similar manner before the incident occurred thereby allowing the computer implemented services to be provided again by the remediated data processing system.

However, although remediation may have corrected impacts of the incident that changed the configurations and/or processes performed by the data processing system, changes in the system state may have occurred due to remediation of the data processing system. In other words, performance of the remediation may not necessarily return the data processing system to the goal state.

For example, consider an example scenario where a hardware component of the data processing system begins to malfunction. The malfunctioning hardware components may impact the operation of other hardware components thereby causing undesired operation of the system. To remediate this issue, a technician may disable the malfunctioning hardware components which may resolve the impact of the issue on the other hardware components. However, this remediation may place the data processing system in a different system state from the goal system state in which the malfunctioning hardware components was operating.

Thus, due to remediation of the data processing system, the system state of the data processing system may differ from the goal state. Because the system state of the data processing system differs from the goal state, other configurations and/or processes in the data processing system used for computer implemented services may be affected.

In general, embodiments disclosed here relate to systems and methods for managing data processing systems to improve the likelihood of the data processing systems being able to provide desired computer implemented services. The data processing systems may be managed by monitoring a system state of the data processing system. The system state may be monitored by checking for differences in the system state of the data processing system and the goal state.

The checking for differences in the system state of the data processing system may be performed during/after remediation of an incident in a data processing system. The remediation of an incident, as noted above, may relieve impacts (e.g., symptoms) of changes in configurations and/or processes performed by the data processing system due to an incident. However, as noted above, the process of relieving the impacts of the changes may not result in the system state of the data processing system returning to the goal state. Rather, the data processing system may, depending on how the impacts of the changes are relieved, cause the system state of the data processing system to enter some other state other than the goal state as a consequence of the remediation of the incident. This may leave the date processing system in a system state in which undesired operation of the data processing system occurs (e.g., unable to provide all or a portion of the computer implemented services, some of the computer implemented services may be impaired, etc.).

To check if the system state is different from the goal state, the goal state of the data processing system may be identified. The identified goal state may be compared to the system state (e.g., the actual state) of the data processing system to identify whether the system state matches the goal state. Performing the comparison may include comparing of configurations and/or processes between both states.

If the system state of the data processing system matches the goal state, then the remediation of the incident may be deemed to have been successful (e.g., it both addressed the symptoms of the incident and returned the system state to the goal state). However, if the system state of the data processing system does not match the goal state, then the remediation may be deemed to have not been successful and remedial activity may be performed to attempt to conform the system state tot the goal state.

The remedial activity may include, for example, modification of configurations and/or processes of the data processing system that may be missing, configured incorrectly not running properly; and/or other types of actions to conform the system state to the goal state. This process may be repeated until the goal state and the system state match.

Once the goal state and system state match, the remediation of the incident may be deemed to be successful. The corpus of both the actions performed may then be recorded along with information regarding the incident so that future similar incidents may attempt to be remediated using the corpus of actions. Doing so may improve the success rate of remediating incidents, may reduce incident remediation time, may improve the uptime of computer implemented services provided by data processing systems, and/or may provide for other benefits to the operation of a system.

To provide the above noted functionality, the system may include deployment 100, and deployment manager 104. Each of these components is discussed below.

Deployment 100 may include any number of data processing system 100A-100N. Data processing system 100A-100N may provide all, or a portion, of the computer implemented services. To do so, the data processing system may need to be in corresponding goal states.

To retain the data processing systems in the goal states, the data processing systems may (i) provide information regarding themselves to deployment manager, and (ii) may perform various actions (e.g., remediations) under the direction of deployment manager 104. For example, any of the data processing system may host an automation framework through which information regarding the data processing systems may be collected by deployment manager 104, and/or deployment manager 104 may invoke various functionalities of the data processing systems.

Deployment manager 104 may manage data processing system 100A-100N to improve the likelihood of data processing systems 100A-100N being able to provide desired computer implemented services. To do so, deployment manager may (i) identify changes system states of data processing system 100A-100N that may impact the ability of the data processing systems to provide desired computer implemented services, (ii) attempt to remediate incidents the precipitated the changes in the system states, (iii) prior to marking the incidents as resolved after the impacts of the incidents have been resolved, verify whether the system state matches corresponding goal states, (iv) if the system states do not match the goal states, perform additional remedial activity to conform the system states to the goal system states, (v) once the goal state and system state, deem the remediation to be complete, and (vi) store information regarding remediations that are deemed to be complete for use in future remediations. Deployment manager 104 may store data about one or more system states of data processing system 100A-100N. Deployment manager 104 may also store repositories of configurations and/or processes that may be implemented in data processing system 100A-100N.

While providing their functionality, any of deployment 100 and deployment manager 104 may perform all, or a portion, of the flows and methods shown in FIGS. 2A-3B.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
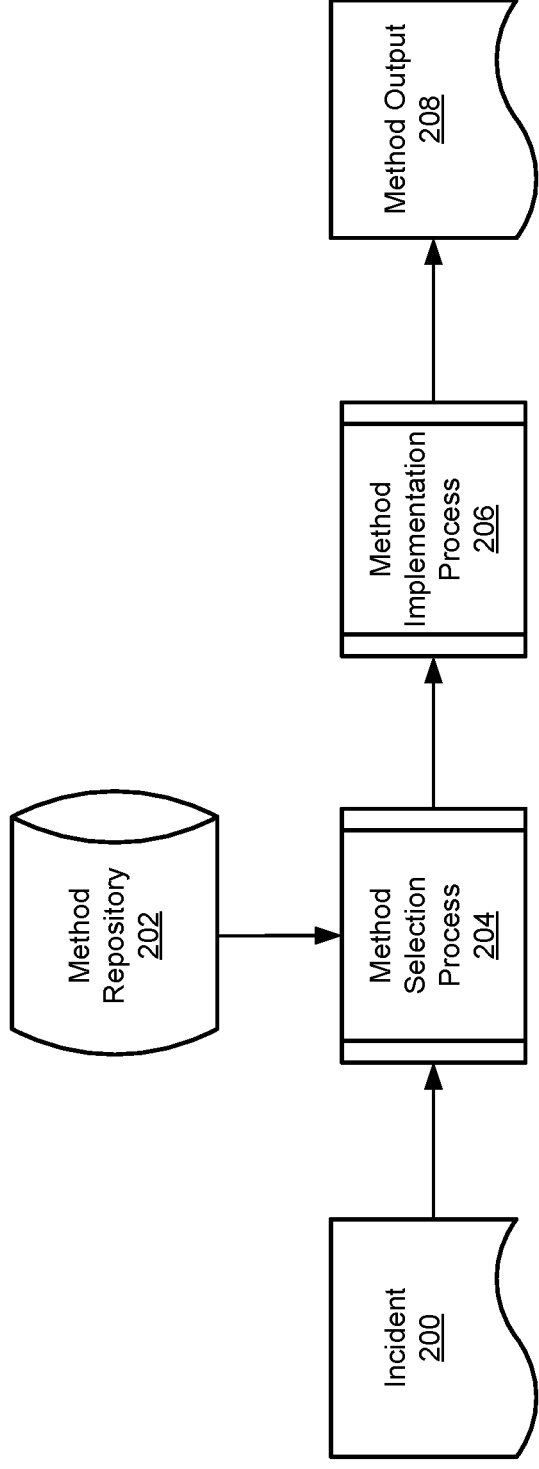
FIGS. 2A-2B show data flow diagrams illustrating operation of a system in accordance with an embodiment.
Figure 2B:
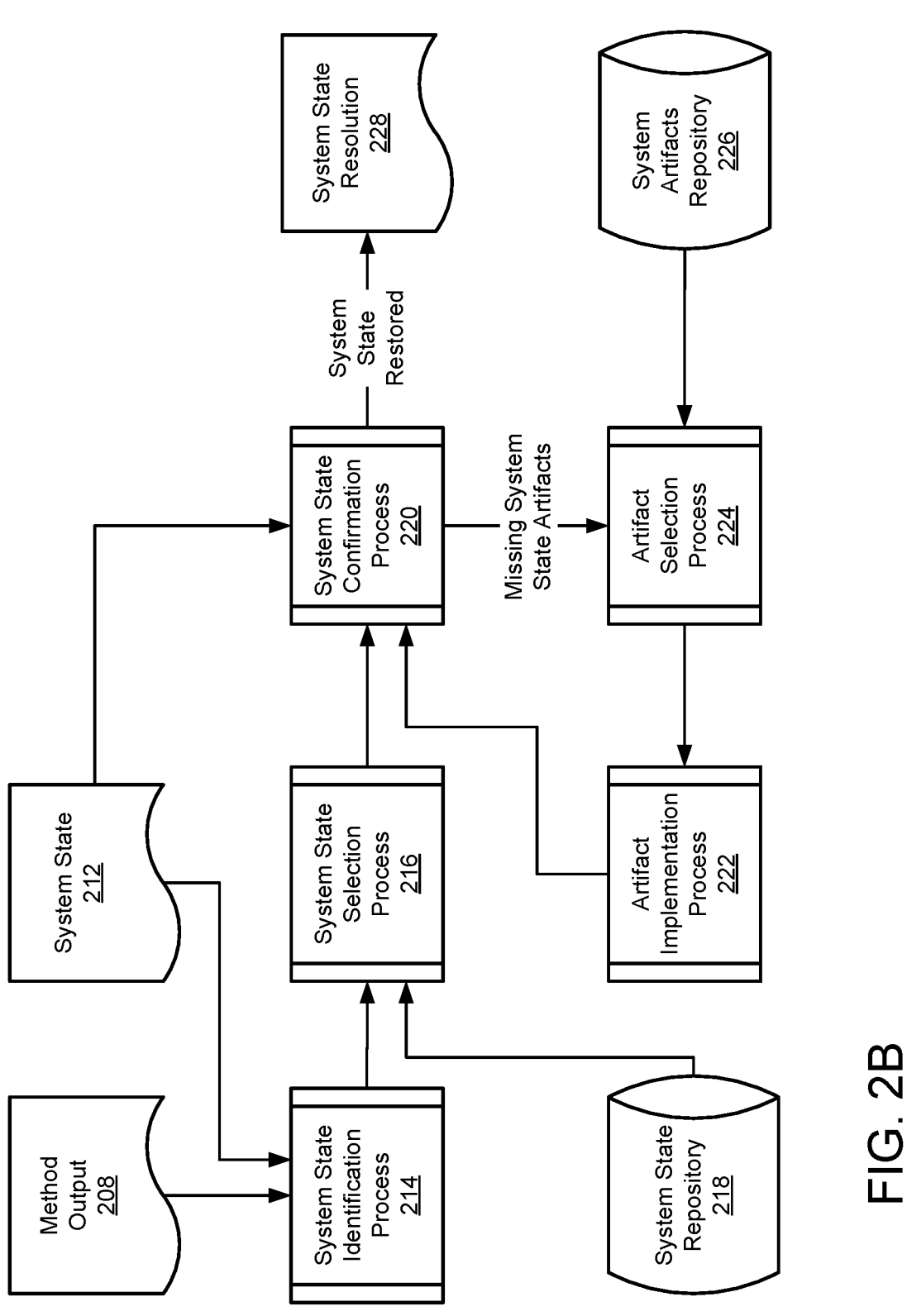

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 208, etc.) is used to represent data structures, a second set of shapes (e.g., 204, 206, etc.) is used to represent processes performed using and/or that generate data, and a third set of shapes (e.g., 202, 218, etc.) is used to represent large scale data structures such as databases.

Turning to FIG. 2A, a first data flow diagram in accordance with an embodiment is shown. The first data flow diagram may illustrate data used in and data processing performed in remediation of an incident in a data processing system.

To remediate an incident, method selection process 204 may be performed. During method selection process 204, incident report 200 may be ingested and used to select a method for remediating the incident. The method may be selected from method repository 202. The incident may regard an error in the system state that prohibits normal operation of the data processing system. As a result of reporting the incident, incident 200 may be created. Incident 200 may include a record of the report and details concerning the error in the system state that prohibits normal operation of the data processing system.

To address incident 200, method selection process 204 may be performed. During method selection process 204, a method may be selected to address the error in the system state that is associated with incident 200. The method may be selected based on the varying types of differences between the system states and the goal state. The method may be a set of instructions in a script that when run initiates execution of one or more processes. The method may also be packaged in a container application that when run executes one or more applications. The method may be automated (e.g. not require human intervention to be executed) or semi-automated (e.g. require some level of human intervention to be executed).

The method may be selected from method repository 202. Method repository 202 may include a directory of scripts and/or container applications that, when executed, can address the error in the system state that prohibits normal operation of the data processing system. After selection of a method from method repository 202, method implementation process 206 may be implemented.

During method implementation process 206, a method selected in method selection process 204 may be implemented in the data processing system experiencing the error in the system state. Method implementation process 206 may include implementing the script, the container application, and/or other type of entity in the data processing system. Performance of the method may generate method output 208.

Method output 208 may include a response of the data processing system to the method implemented in method implementation process 206. The response of the data processing system may include the solution used to address the error in the system state that prohibits normal operation of the data processing system. The response may list changes in the system state that enable normal operation of the data processing system.

The script, container application, and/or other type of entity used to address the error in the system state of the data processing system may address the error and remediate the data processing system. In addressing the error and remediating the data processing system, the changes in the system state, listed by method output 208, may leave the system state in a different state than a goal state for the data processing system.

Turning to FIG. 2B, a second data flow diagram in accordance with an embodiment is shown. The second data flow diagram may illustrate data used in and data processing performed in restoration of a system state in a data processing system into a goal state.

To restore the system state to the goal state, system state identification process 214 may be performed. During system state identification process 214, a difference between the system state of the data processing system and the goal state may be identified by analyzing method output 208 and/or system state 212. Method output 208 may list the differences between system state dataset 212 and the goal state. System state 212 may be a current system state of the data processing system. System state 212 may, therefore, reflect the state of a data processing system after a remediation was performed, as shown in FIG. 2A. Once system state 212 and method output 208 have been identified, system state selection process 216 may be performed.

During system state selection process 216, the goal state for the data processing system may be identified. To identify the goal state for the data processing system, the system state of the data processing system may be compared to goal states in system state repository 218 to find the goal state for the data processing system. Once the goal state is found, system state confirmation process 220 may be performed.

During system state confirmation process 220, the goal state from system state repository 218 may be compared with the system state of the data processing system. In a comparison of the system state and the goal state, if any difference is found to exist, then it may be concluded that the remediation process should continue to address these differences. To continue to remediate the data processing system, an artifact may be implemented in the data processing system. To search for the appropriate artifact to remediate the data processing system, artifact selection process 224 may be performed.

During artifact selection process 224, system artifacts repository 226 may be searched for an artifact that will remediate system state 212 of the data processing system to match the goal state. The artifact may include a script, container applications, and/or other type of entity, when implemented, will likely remediate the difference between system state 212 of the data processing system and the goal state. Once an artifact has been selected, artifact implementation process 222 may be performed.

During artifact implementation process 224, the artifact may be implemented in the system state of the data processing system. Artifact implementation process 222 may be an automated process (e.g. not require human intervention to be executed) or a semi-automated process (e.g. require some level of human intervention to be executed) by which to remediate system state 212 of the data processing system to match the goal state. Once the artifact has been implemented, system state confirmation process 220 may be performed again.

During system state confirmation process 220, the goal state may be compared again with system state 212 of the data processing system. If the difference (or new differences) between system state 212 of the data processing system and the goal state still exists, artifact selection process 224 may be performed again. If artifact selection process 224 is performed again, a new artifact may be selected to implement on system state 212 to remediate the difference between system state 212 and the goal state. Otherwise, if system state 212 matches the goal state, then system state 212 of the data processing system may be considered to be remediated.

Once the system state has been considered to be implement, system state resolution 228 may be generated. System state resolution 228 may be a dataset that includes (i) the goal state for system state 212 from system state repository 218, (ii) the difference between system state 212 and the goal state, (iii) the one or more artifacts that were implemented in system state 212 to cause system state 212 to match the goal state, (iv) the changes in system state 212 caused by the one or more artifacts to cause system state 212 to match the goal state, and/or other information regarding the performed remediation process. System state resolution 228 may be indexed and/or otherwise placed in condition for future use in performing remediations. In other words, system state resolution 228 may allow the artifacts for a remediation to be identified and used more efficiently in future remediations for a same type of issue.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
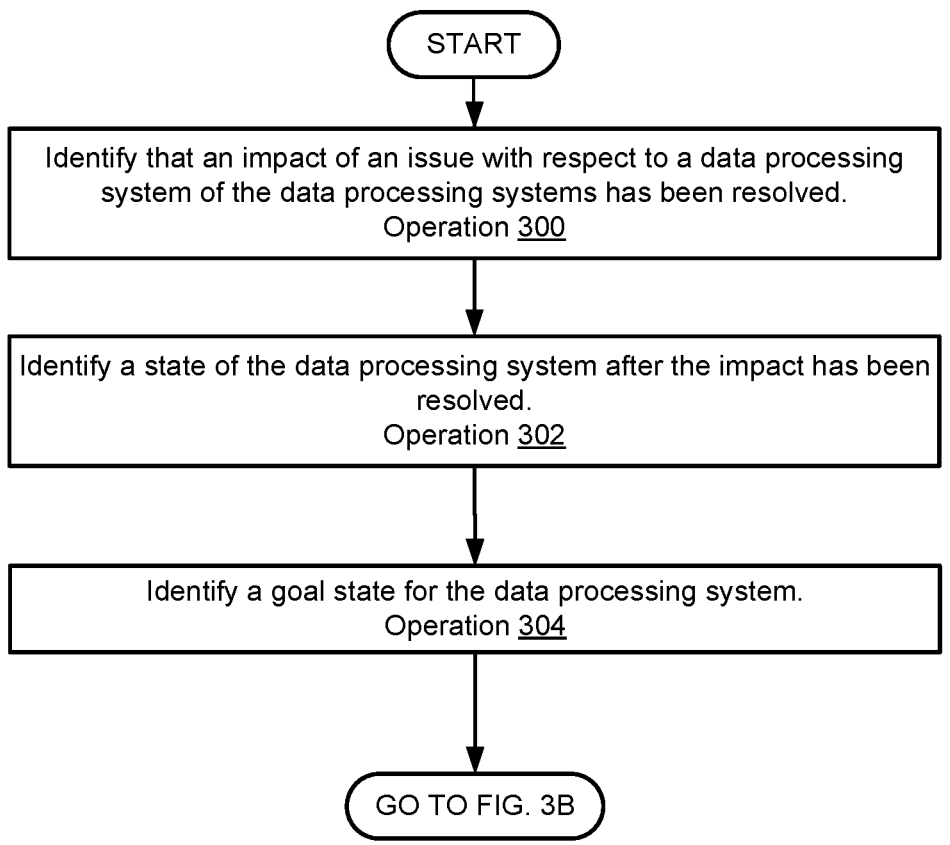
FIG. 3A-3B show flow diagrams illustrating a method in accordance with an embodiment.
Figure 3B:
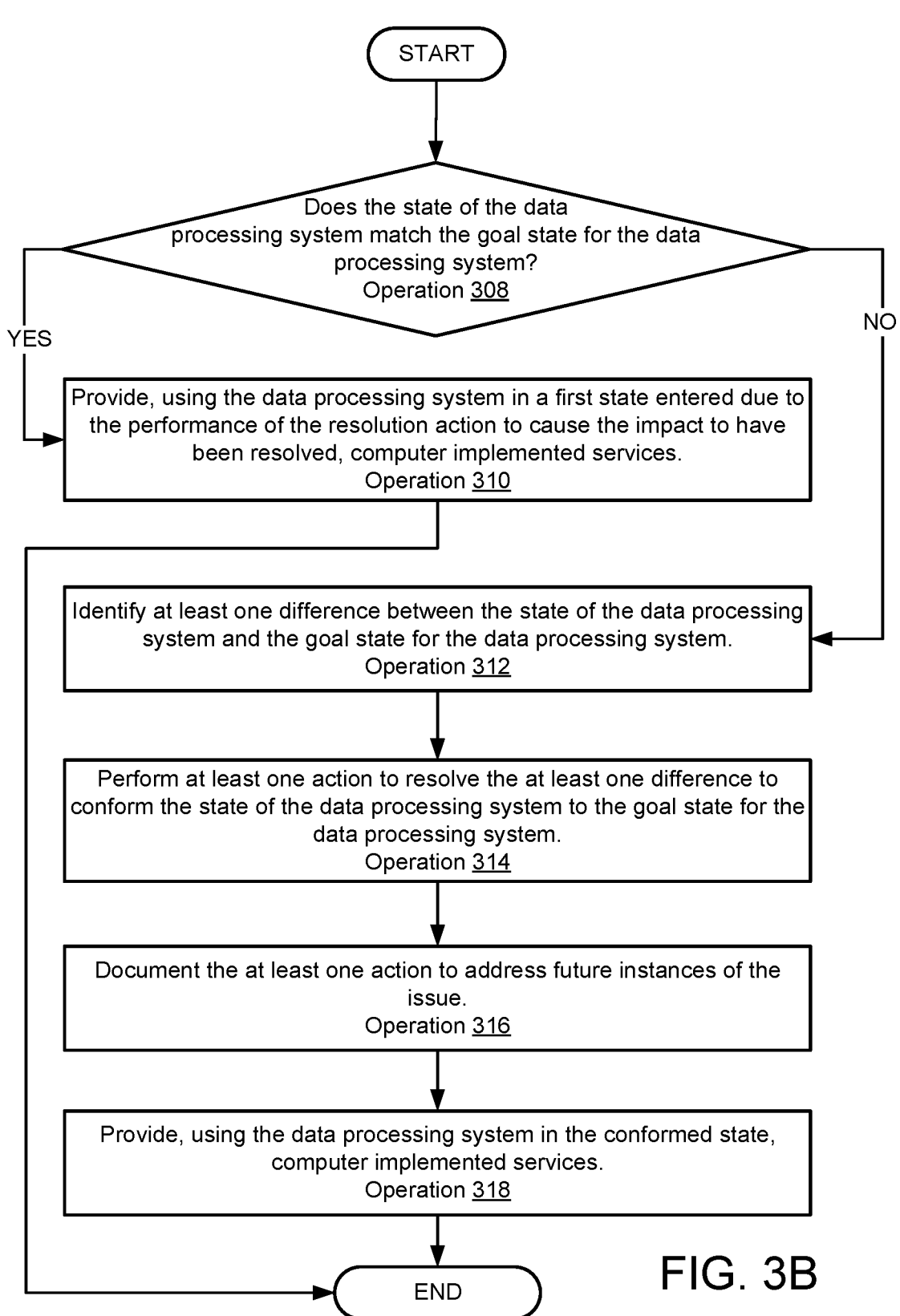

As discussed above, the components of FIG. 1 may perform various methods to manage data processing systems. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing data processing systems in accordance with an embodiment is shown. The method may be performed, for example, by any of the components of the system of FIG. 1, and/or other components not shown therein.

At operation 300, an impact of an issue with respect to a data processing system of the data processing systems may be identified that has been resolved. The impact may be identified by reading a record of the impact that notes that the issue with the data processing system and that it has been resolved.

At operation 302, a state of the data processing system may be identified after the impact has been resolved. The state may be identified by (a) obtaining telemetry data from the data processing system after the impact has been resolved; (b) enumerating processes hosted by the data processing system using the telemetry data; and (c) enumerating configurations for at least the processes and/or hardware components of the data processing system.

Telemetry data may be obtained by receiving the telemetry data from the data processing system. Processes may be enumerated using the telemetry data by reading the telemetry data, identifying the processes in the telemetry data, and sorting the processes in a first dataset. Configurations may be enumerated by reading the telemetry data, identifying the processes and/or the hardware components from the telemetry data and sorting the configurations and/or the hardware components in a second dataset.

At operation 304, a goal state for the data processing system may be identified. The goal state may be identified by (a) selecting a goal state from a repository of goal states; (b) comparing configurations and/or processes between the goal state and the state of the data processing system; and (c) confirming if the goal state may have been an original state of the state of the data processing system.

Turning to FIG. 3B, FIG. 3B shows a continuation of the flow diagram shown in FIG. 3A.

At operation 308, a determination may need to be made regarding whether the state of the data processing system matches the goal state for the data processing system. The determination may be made by comparing the configurations and/or processes of the goal state to the configurations and/or processes of the state of the data processing system.

If the state of the data processing system matches the goal state for the data processing system, then the method may proceed to operation 310. Otherwise, if the state of the data processing system does not match the goal state for the data processing system, then the method may proceed to operation 312.

At operation 310, computer implemented services may be provided, using data processing system in a first state entered due to the performance of the resolution action to cause the impact to have been resolved. The computer implemented services may be provided by implementing configurations and/or processes using the state of the data processing system.

The method may end at operation 310.

Returning to operation 308, at operation 312, at least one difference between the state of the data processing system and the goal state for the data processing system may be identified. The at least one difference may be identified by (a) making a first comparison between the enumerated processes and the set of processes to identify a process difference; (b) making a second comparison between the enumerated configuration at the set of configurations to identify a configuration difference; and (c) obtaining the at least one difference using the process difference and/or the configuration difference.

The first comparison may be made by searching for the enumerated processes within the set of the processes to find missing processes. The second comparison may be made by searching for the enumerated configurations within the set of the set of configurations to find missing configurations. The at least one difference may be obtained by identifying missing processes and/or configurations within the first comparison and/or the second comparison.

At operation 314, at least one action may be performed to resolve the at least one difference to conform the state of the data processing system to the goal state for the data processing system. The at least one action may be performed by (a) selecting an action from a list of actions, and (b) executing the action on the data processing system.

At operation 316, the at least one action may be documented to address future instances of the issue. The at least one action may be documented by storing the action in a repository of actions.

At operation 318, computer implemented services may be provided using the data processing system in the conformed state. The computer implemented services may be provided by implementing configurations and/or processes using the state of the data processing system.

The method may end following operation 318.

Figure 4:
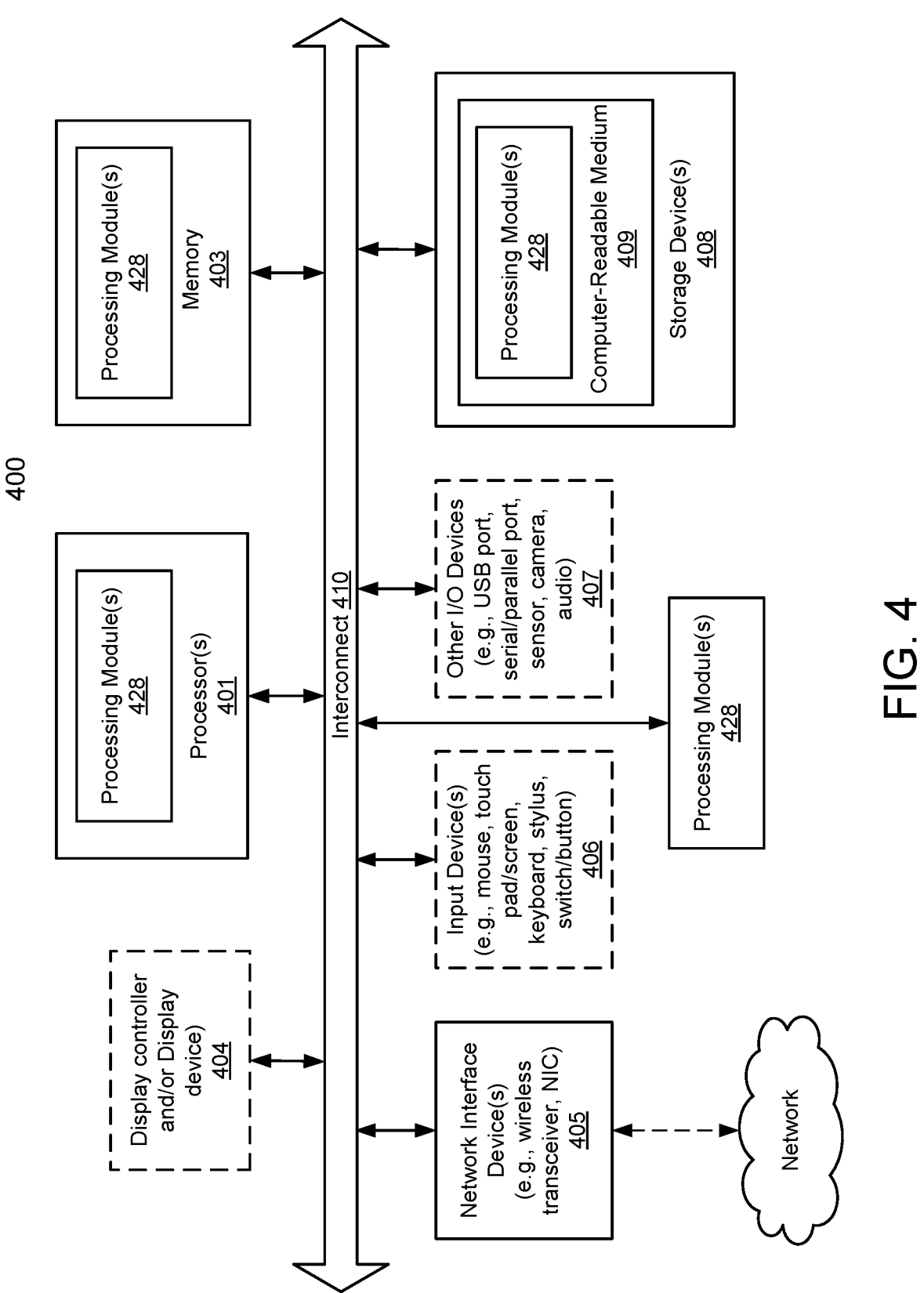
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera-tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

The invention claimed is:

1. A method for managing data processing systems, the method being performed by a computing device, comprising a processor and a memory, configured as a deployment manager that manages the data processing systems and comprising:

identifying that an impact of an issue with respect to a data processing system of the data processing systems has been resolved;

identifying a state of the data processing system after the impact has been resolved;

identifying a goal state for the data processing system;

making a determination regarding whether the state of the data processing system matches the goal state for the data processing system;

in a first instance of the determination where the state of the data processing system does not match the goal state for the data processing system:

identifying at least one difference between the state of the data processing system and the goal state for the data processing system;

parsing an artifacts repository of the deployment man-ager to retrieve an artifact that, when executed by the data processing system, causes the data processing system to automatically resolve the at least one difference between the state of the data processing system and the goal state for the data processing system, the parsing being based on the at least one difference and the artifact being a script or container application comprising computer code;

transmitting, using a network connection between the deployment manager and the data processing system, the artifact to the data processing system with instructions for the data processing system to execute the artifact to cause, by the deployment manager, the data processing system to execute at least one action selection from a list of actions consisting of: install-ing a first software package included in the artifact, removing a second software package identified in the artifact, and updating hardware and/or software con-figurations of the data processing system using one or more configurations included in the artifact;

documenting the parsing and the transmitting to address future instances of the issue; and providing, using the data processing system and after the data processing system has completed execution of the artifact, computer implemented services.

2. The method of claim 1, wherein performance of a resolution action to cause the impact to have been resolved causes the at least one difference between the state of the data processing system and the goal state of the data processing system.

3. The method of claim 1, wherein identifying the state of the data processing system comprises:

obtaining telemetry data from the data processing system after the impact has been resolved;

enumerating processes hosted by the data processing system using the telemetry data; and enumerating configurations for at least the processes and/or hardware components of the data processing system.

4. The method of claim 3, wherein the goal state comprises:

first information regarding a set of processes for the data processing system for the data processing system to operate in a desired manner; and second information regarding a set of configurations for the processes and/or the hardware components of the data processing system to operate in the desired manner.

5. The method of claim 4, wherein identifying at least one difference comprises:

making a first comparison between the enumerated processes and the set of processes to identify a process difference;

making a second comparison between the enumerated configuration at the set of configurations to identify a configuration difference; and obtaining the at least one difference using the process difference and/or the configuration difference.

6. The method of claim 1, wherein in a second instance of the determination where the state of the data processing system matches the goal state for the data processing system:

providing, using the data processing system in a first state entered into due to the performance of a resolution action to cause the impact to have been resolved, computer implemented services.

7. The method of claim 1, further comprising:

performing a runbook automation to attempt to resolve the issue.

8. The method of claim 7, wherein documenting the parsing and the transmitting to address future instances of the issue comprises:

adding a new entry to a runbook automation database, the new entry being based at least in part on the parsing and the transmitting.

9. A non-transitory machine-readable medium having instructions stored therein, which when executed by a processor of a deployment manager that manages data processing systems, cause the processor to perform operations for managing the data processing systems, the operations comprising:

identifying that an impact of an issue with respect to a data processing system of the data processing systems has been resolved;

identifying that an impact of an issue with respect to a data processing system of the data processing systems has been resolved;

identifying a state of the data processing system after the impact has been resolved;

identifying a goal state for the data processing system;

making a determination regarding whether the state of the data processing system matches the goal state for the data processing system;

in a first instance of the determination where the state of the data processing system does not match the goal state for the data processing system:

identifying at least one difference between the state of the data processing system and the goal state for the data processing system;

parsing an artifacts repository of the deployment manager to retrieve an artifact that, when executed by the data processing system, causes the data processing system to automatically resolve the at least one difference between the state of the data processing system and the goal state for the data processing system, the parsing being based on the at least one difference and the artifact being a script or container application comprising computer code;

transmitting, using a network connection between the deployment manager and the data processing system, the artifact to the data processing system with instructions for the data processing system to execute the artifact to cause, by the deployment manager, the data processing system to execute at least one action selection from a list of actions consisting of: installing a first software package included in the artifact, removing a second software package identified in the artifact, and updating hardware and/or software configurations of the data processing system using one or more configurations included in the artifact;

documenting the parsing and the transmitting to address future instances of the issue; and providing, using the data processing system and after the data processing system has completed execution of the artifact, computer implemented services.

10. The non-transitory machine-readable medium of claim 9, wherein performance of a resolution action to cause the impact to have been resolved causes the at least one difference between the state of the data processing system and the goal state of the data processing system.

11. The non-transitory machine-readable medium of claim 9, wherein identifying the state of the data processing system comprises:

obtaining telemetry data from the data processing system after the impact has been resolved;

enumerating processes hosted by the data processing system using the telemetry data; and enumerating configurations for at least the processes and/or hardware components of the data processing system.

12. The non-transitory machine-readable medium of claim 11, wherein the goal state comprises:

first information regarding a set of processes for the data processing system for the data processing system to operate in a desired manner; and second information regarding a set of configurations for the processes and/or the hardware components of the data processing system to operate in the desired manner.

13. The non-transitory machine-readable medium of claim 12, wherein identifying at least one difference comprises:

making a first comparison between the enumerated processes and the set of processes to identify a process difference;

making a second comparison between the enumerated configuration at the set of configurations to identify a configuration difference; and obtaining the at least one difference using the process difference and/or the configuration difference.

14. The non-transitory machine-readable medium of claim 9, wherein in a second instance of the determination where the state of the data processing system matches the goal state for the data processing system:

providing, using the data processing system in a first state entered into due to the performance of a resolution action to cause the impact to have been resolved, computer implemented services.

15. A deployment manager, comprising:

a processor; and a memory coupled to the processor to store instructions, which when executed by the processor, cause the processor to perform operations for managing data processing systems, the operations comprising:

identifying that an impact of an issue with respect to a data processing system of the data processing systems has been resolved;

identifying a state of the data processing system after the impact has been resolved;

identifying a goal state for the data processing system;

making a determination regarding whether the state of the data processing system matches the goal state for the data processing system;

in a first instance of the determination where the state of the data processing system does not match the goal state for the data processing system:

identifying at least one difference between the state of the data processing system and the goal state for the data processing system;

parsing an artifacts repository of the deployment manager to retrieve an artifact that, when executed by the data processing system, causes the data processing system to automatically resolve the at least one difference between the state of the data processing system and the goal state for the data processing system, the parsing being based on the at least one difference and the artifact being a script or container application comprising computer code;

transmitting, using a network connection between the deployment manager and the data processing system, the artifact to the data processing system with instructions for the data processing system to execute the artifact to cause, by the deployment manager, the data processing system to execute at least one action selection from a list of actions consisting of: installing a first software package included in the artifact, removing a second software package identified in the artifact, and updating hardware and/or software configurations of the data processing system using one or more configurations included in the artifact;

documenting the parsing and the transmitting to address future instances of the issue; and providing, using the data processing system and after the data processing system has completed execution of the artifact, computer implemented services.

16. The deployment manager of claim 15, wherein performance of a resolution action to cause the impact to have been resolved causes the at least one difference between the state of the data processing system and the goal state of the data processing system.

17. The deployment manager of claim 15, wherein identifying the state of the data processing system comprises:

obtaining telemetry data from the data processing system after the impact has been resolved;

enumerating processes hosted by the data processing system using the telemetry data; and enumerating configurations for at least the processes and/or hardware components of the data processing system.

18. The deployment manager of claim 17, wherein the goal state comprises:

first information regarding a set of processes for the data processing system for the data processing system to operate in a desired manner; and second information regarding a set of configurations for the processes and/or the hardware components of the data processing system to operate in the desired manner.

19. The deployment manager of claim 18, wherein identifying at least one difference comprises:

making a first comparison between the enumerated processes and the set of processes to identify a process difference;

making a second comparison between the enumerated configuration at the set of configurations to identify a configuration difference; and obtaining the at least one difference using the process difference and/or the configuration difference.

20. The method of claim 1, further comprising and prior to identifying that the impact of the issue with respect to the data processing system has been resolved:

generating a container application that when executed by the data processing system causes the data processing system to automatically repair itself to remediate the issue, the issue being an error within the data processing system that prevents the data processing system from operating; and transmitting the container application to the data processing system with instructions for the data processing system to execute the container application.

\* \* \* \* \*